(12) United States Patent
Li

(10) Patent No.: US 11,494,049 B2
(45) Date of Patent: Nov. 8, 2022

(54) METHOD AND DEVICE FOR DISPLAYING APPLICATION ICON, AND STORAGE MEDIUM

(71) Applicant: Beijing Xiaomi Mobile Software Co., Ltd., Beijing (CN)

(72) Inventor: Jiayan Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 20 days.

(21) Appl. No.: 17/017,219

(22) Filed: Sep. 10, 2020

(65) Prior Publication Data

US 2021/0333981 A1 Oct. 28, 2021

(30) Foreign Application Priority Data

Apr. 26, 2020 (CN) .......................... 202010339129.0

(51) Int. Cl.
*G06F 3/04817* (2022.01)
*G06F 3/04842* (2022.01)

(52) U.S. Cl.
CPC ...... *G06F 3/04817* (2013.01); *G06F 3/04842* (2013.01)

(58) Field of Classification Search
CPC .................................................. G06F 3/04817
See application file for complete search history.

(56) References Cited

U.S. PATENT DOCUMENTS

| 2002/0054158 A1* | 5/2002 | Asami | G06T 11/206 715/838 |
| 2010/0077336 A1* | 3/2010 | Ording | G06F 3/0486 715/769 |
| 2012/0084688 A1* | 4/2012 | Robert | G06F 3/0484 715/769 |
| 2018/0157399 A1* | 6/2018 | Cansino | G06F 3/165 |

FOREIGN PATENT DOCUMENTS

| CN | 105511728 A | 4/2016 |
| CN | 106325649 A | 1/2017 |
| CN | 106325650 A | 1/2017 |
| CN | 106325835 A | 1/2017 |
| CN | 108319406 A | 7/2018 |
| CN | 108694006 A | 10/2018 |
| CN | 110162249 A | 8/2019 |

OTHER PUBLICATIONS

Mei Xiaoqing et al., "Web page making basic tutorial", Beijing Institute of Technology Press, pp. 192-194, 2007, 11 pages.
European Search Report in European Application No. 20198724.5, dated Mar. 26, 2021.

* cited by examiner

*Primary Examiner* — Roland J Casillas
(74) *Attorney, Agent, or Firm* — Finnegan, Henderson, Farabow, Garrett & Dunner, L.L.P.

(57) ABSTRACT

A method for displaying an application icon on a terminal, includes: receiving an operation on an application icon displayed on a display interface of the terminal; and determining and displaying a dynamic picture of the application icon according to the operation.

18 Claims, 7 Drawing Sheets

S11
An operation on an application icon displayed on a display interface of the terminal is received S12
A dynamic picture of the application icon is determined and displayed according to the operation

METHOD AND DEVICE FOR DISPLAYING APPLICATION ICON, AND STORAGE MEDIUM

CROSS-REFERENCE TO RELATED APPLICATIONS

This application is based on and claims priority to Chinese Application No. 202010339129.0 filed on Apr. 26, 2020, the content of which is hereby incorporated by reference in its entirety.

TECHNICAL FIELD

The present disclosure relates to the technical field of terminals, and more particularly, to a method and device for displaying an application icon and a storage medium.

BACKGROUND

With the continuous development of the wireless technology, a virtual desktop may be displayed on a screen of a terminal. A certain number of application icons are displayed on the virtual desktop. A user may execute software by selecting an application icon corresponding to the software.

Conventionally, to improve effect of displaying an application icon in a screen, a depth appearance may be provided on an image surface using shadow technology to implement a dynamic visual effect of an image. Alternatively, dynamic display of an application icon may be implemented by deforming an image of the application icon. The appearance of the image of an application icon using the conventional technologies may not provide a good visual effect.

SUMMARY

According to a first aspect of the present disclosure, a method for displaying an application icon on a terminal includes: receiving an operation on an application icon displayed on a display interface of the terminal; and determining and displaying a dynamic picture of the application icon according to the operation.

According to a second aspect of the present disclosure, a terminal includes a processor and a memory storing an instruction executable by the processor. The processor is configured to: receive an operation on an application icon displayed on a display interface of the terminal; and determine and display a dynamic picture of the application icon according to the operation.

According to a third aspect of the present disclosure, a non-transitory computer-readable storage medium has stored thereon computer executable instructions which, when executed by a processor, implement the method according to the first aspect.

The above general description and detailed description below are exemplary and explanatory, and do not limit the disclosure.

BRIEF DESCRIPTION OF THE ACCOMPANYING DRAWINGS

The accompanying drawings, which are incorporated in and constitute part of the specification, illustrate embodiments consistent with the disclosure, and together with the specification, serve to explain the principle of the disclosure.

DETAILED DESCRIPTION

Exemplary embodiments will be described in detail below, examples of which are illustrated in the accompanying drawings. When the following description refers to the accompanying drawings, the same numbers in different drawings represent the same or similar elements unless otherwise indicated. Implementations set forth in the following exemplary embodiments do not represent all implementations consistent with the disclosure. Rather, they are mere examples of devices and methods in accordance with certain aspects of the disclosure as recited in the appended claims.

Terms used in the disclosure are for describing the exemplary embodiments instead of limiting the disclosure. For example, the term "first" and "second" may be used to differentiate various elements, and the elements should not be limited to such terms. For example, without departing from the scope of the disclosure, first information may also be referred to as second information. Similarly, second information may also be referred to as first information.

Methods provided in the present disclosure may be used in a scene where an application icon in a display interface of a terminal is displayed according to an operation on the application icon. The terminal may be a smart terminal, a mobile terminal, user equipment (UE), a Mobile Station (MS), equipment or a chip provided therein that provides a user with a voice and/or data connection, such as handheld equipment, onboard equipment, etc., with a wireless connection function. Examples of the terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

Figure 1:
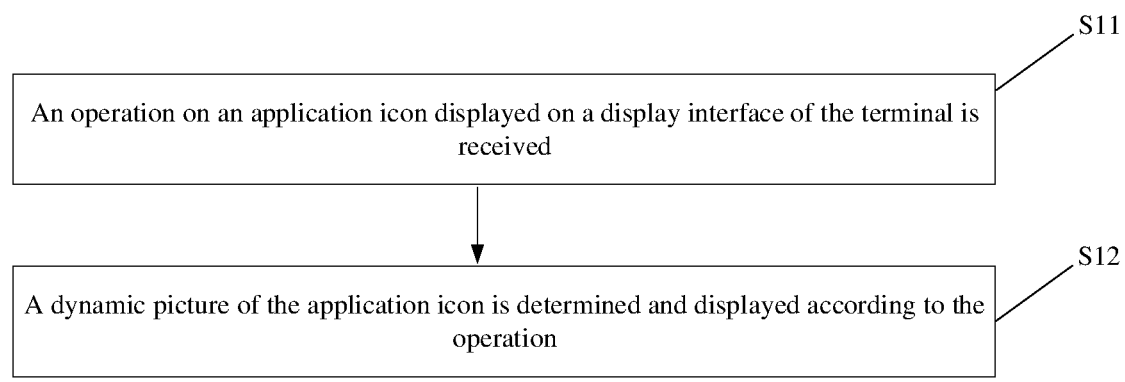
FIG. 1 is a flow diagram of a method for displaying an application icon according to an exemplary embodiment.

FIG. 1 is a flow diagram of a method for displaying an application icon according to an exemplary embodiment. For example, the method for displaying an application icon may be used in a terminal. As shown in FIG. 1, the method may include the following operations.

In S11, an operation on an application icon displayed on a display interface of the terminal is received.

The operation on the application icon by a user may be referred to as an application icon operation. An application icon operation may include at least one of a moving operation, a clicking operation, a deleting operation, a put-at-top operation, an updating operation, or a fixing operation on an application icon.

In S12, a dynamic picture of the application icon is determined and displayed according to the operation.

In an embodiment, an operation parameter of the operation on the application icon may be acquired according to the operation. The operation parameter may indicate a mode of operation by the user on the application icon, as well as an operation speed, an operation direction, an operation location, etc., of the user in the mode of operation. After the operation parameter of the operation on the application icon is acquired, a dynamic picture of the application icon may be acquired by moving an image of the application icon according to the operation parameter of the operation on the application icon.

For example, the user may perform a moving operation of moving the application icon. A parameter indicating a moving speed at which the application icon is moved, a moving direction along which the application icon is moved, etc., may be acquired. The dynamic picture of the application icon may be acquired by moving an image of the application icon at the moving speed along the moving direction corresponding to the parameter acquired.

In the embodiment, the operation on the application icon displayed on the display interface of the terminal is received. The operation parameter of the operation on the application icon may be acquired. The image of the application icon may be controlled to move according to the operation parameter of the operation on the application icon. The effect of the actual operation on the application icon by the user is simulated, rendering display of the application icon three-dimensional and lifelike.

In an embodiment, the application icon may include one layer or multiple layers. For illustrative purposes only, it is assumed that the application icon includes multiple layers in the description below.

Figure 2:
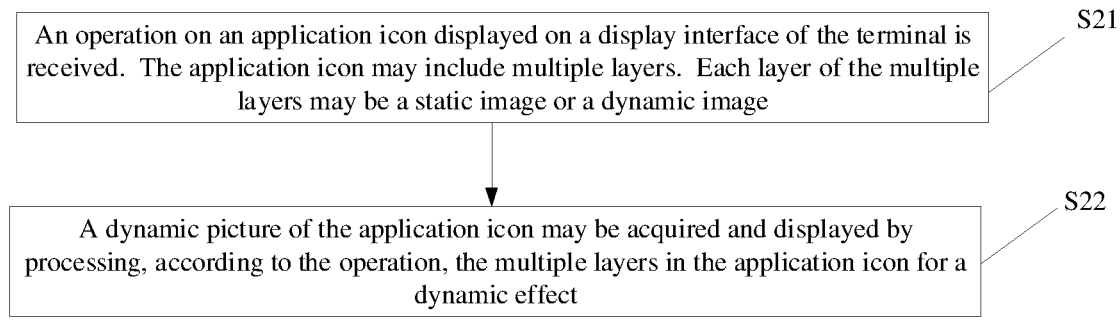
FIG. 2 is a flow diagram of a method for displaying an application icon according to an exemplary embodiment.

FIG. 2 is a flow diagram of a method for displaying an application icon according to an exemplary embodiment. For example, the method for displaying an application icon may be used in a terminal. As shown in FIG. 2, the method may include the following operations.

In S21, an operation on an application icon displayed on a display interface of the terminal is received. The application icon may include multiple layers. Each layer of the multiple layers may be a static image or a dynamic image.

In an embodiment, the dynamic image may be an animation made according to a separate animation mechanism. When the operation on the application icon is received, an animation internal to a layer in the application icon may be displayed according to the separate animation mechanism.

In S22, a dynamic picture of the application icon may be acquired and displayed by processing, according to the operation, the multiple layers in the application icon for a dynamic effect.

In the embodiment, to simulate an effect of an actual operation on the application icon by the user and implement more lifelike three-dimensional display of the application icon, the dynamic picture of the application icon for the operation may be acquired and displayed by processing, according to the operation on the application icon by the user, the multiple layers in the application icon for the dynamic effect.

In an embodiment, the multiple layers in the application icon may be processed for the dynamic effect as follows.

An operation parameter of the operation on the application icon by the user may be acquired. A processing mode in which the multiple layers in the application icon are processed for the dynamic effect may be determined based on the operation parameter. The dynamic picture of the application icon may be acquired by processing the multiple layers in the processing mode in which the multiple layers in the application icon are processed for the dynamic effect.

For example, the user may perform a moving operation of moving an application icon. A moving parameter, including such as a moving speed, an upward moving direction, etc., according to which the user moves the application icon, may be collected through a sliding process of a touch gesture of the user. Based on the moving speed and the upward moving direction, a processing mode in which the multiple layers in the application icon are processed may be determined. For example, the multiple layers in the application icon may be moved upward. Moreover, each layer in the application icon may be moved upward based on the mode of moving the multiple layers in the application icon upward, acquiring the dynamic picture of the application icon.

In the embodiment, the operation on a multi-layer application icon displayed on the display interface of the terminal is received. The multiple layers in the application icon are processed for a dynamic effect according to the operation on the application icon. The effect of the actual operation on the application icon by the user is simulated, rendering display of the application icon three-dimensional and lifelike.

In the following embodiments, a dynamic picture of an application icon is acquired and displayed by processing, according to a received user operation on the application icon, multiple layers in the application icon for a dynamic effect.

Figure 3:
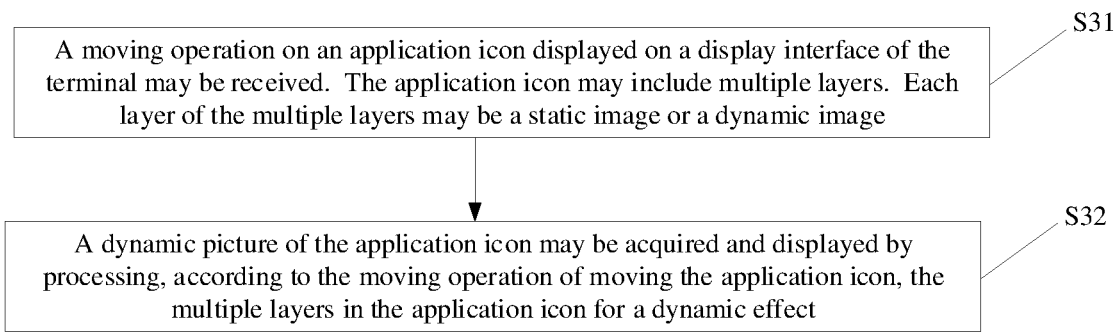
FIG. 3 is a flow diagram of a method for displaying an application icon according to an exemplary embodiment.

FIG. 3 is a flow diagram of a method for displaying an application icon according to an exemplary embodiment. For example, the method for displaying an application icon may be used in a terminal. As shown in FIG. 3, the method may include the following operations.

In S31, a moving operation on an application icon displayed on a display interface of the terminal may be received. The application icon may include multiple layers. Each layer of the multiple layers may be a static image or a dynamic image.

In S32, a dynamic picture of the application icon may be acquired and displayed by processing, according to the moving operation of moving the application icon, the multiple layers in the application icon for a dynamic effect.

In an embodiment, a moving parameter for moving the application icon may be acquired according to the moving operation performed on the application icon by a user. For example, a moving speed at which the application icon is moved, and a moving direction along which the application icon is moved, may be acquired. The dynamic picture of the application icon may be acquired by moving the multiple layers in the application icon respectively according to the moving speed and the moving direction.

In an embodiment, the dynamic picture of the application icon may be acquired by moving the multiple layers in the application icon according to the moving speed and the moving direction for moving the application icon, as follows.

The moving parameter corresponding to a layer in the application icon, namely a moving speed and a moving direction, may be acquired. The layer in the application icon may be moved according to the moving parameter corresponding to the layer, and the moving speed and the moving direction for moving the application icon. The moving parameter corresponding to the layer may be determined based on a level of the layer in an attribute of the layer. The level of the layer may indicate an amplitude that the layer is to move.

For example, the application icon may include three layers. The first layer may be an image of a box. The second layer may be an image of a sphere. The third layer may be an image of a lid of the box. The first layer to the third layer may be of a level 3, a level 1, and a level 3, respectively. The user may perform a leftward moving operation on the application icon to move the application icon to the left. A speed at which a layer in the application icon is moved to the left, and the direction along which the layer is moved, may be acquired according to the level of the layer. Each layer in the application icon may be controlled to move according to the speed and the direction corresponding to the layer. That is, according to a speed and a direction for moving the application icon to the left, the first layer and the third layer may be controlled to move to the left at one speed, and the second layer may be controlled to move to the left at a speed less than that of the first layer and the third layer.

In addition, after the moving operation on the application icon has ended, an effect of dynamic return of a layer may be displayed according to an attribute of the layer. For example, the first layer and the third layer may return at a speed greater than that at which the second layer returns, thereby achieving scattered fall of different layers, resulting a visual effect of joint fall of different weights.

In the embodiment, the moving operation on the application icon displayed on the display interface of the terminal is received. The layer in the application icon is controlled to move according to the moving operation on the application icon, a moving speed at which the application icon is moved, and a moving direction along which the application icon is moved. The application icon is displayed according to a trajectory of the layer in the application icon. The effect of the actual operation on the application icon by the user is simulated. The speed at which a layer moves is controlled according to the level of the layer, implementing lifelike three-dimensional display of the application icon.

Figure 4:
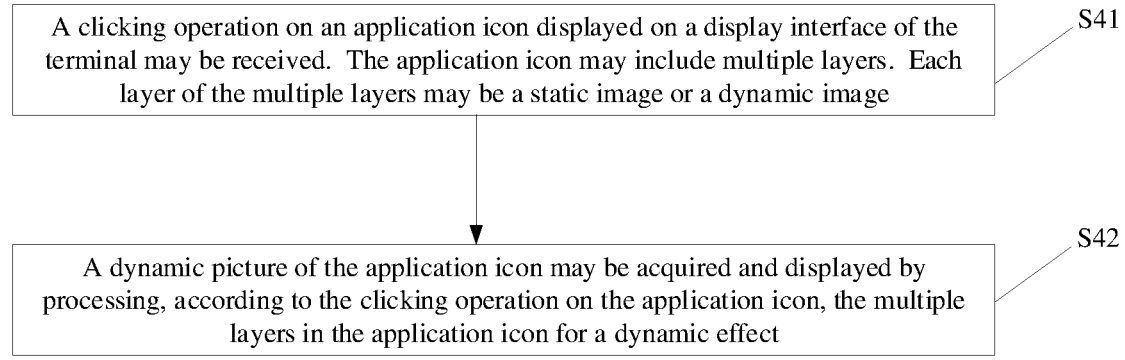
FIG. 4 is a flow diagram of a method for displaying an application icon according to an exemplary embodiment.

FIG. 4 is a flow diagram of a method for displaying an application icon according to an exemplary embodiment. For example, the method for displaying an application icon may be used in a terminal. As shown in FIG. 4, the method may include the following operations.

In S41, a clicking operation on an application icon displayed on a display interface of the terminal may be received. The application icon may include multiple layers. Each layer of the multiple layers may be a static image or a dynamic image.

In S42, a dynamic picture of the application icon may be acquired and displayed by processing, according to the clicking operation on the application icon, the multiple layers in the application icon for a dynamic effect.

In an embodiment, an operation parameter of the clicking operation may be acquired according to a location where a user performs the clicking operation on the application icon. That is, the location where the clicking operation is performed may be acquired. For example, the location may be an upper left corner of the application icon, a lower right corner of the application icon, a center location of the application icon, etc. The dynamic picture of the application icon may be acquired by expanding the multiple layers in the application icon outward starting from the location where the clicking operation is performed.

In an embodiment, the dynamic picture of the application icon may be acquired by expanding the multiple layers in the application icon outward starting from the location as follows.

An expanding parameter corresponding to a layer in the application icon may be acquired. The expanding parameter may be determined based on a level of the layer. The level of the layer may indicate an amplitude that the layer is to move. The layer in the application icon may be controlled, according to the expanding parameter, to expand outward starting from the location where the clicking operation is performed.

For example, for the application icon including the three layers, the operation on the application icon may be a click on the center location of the application icon. Acquired attributes of the first layer to the third layer may be the level 3, the level 1, and the level 3, respectively. An expanding parameter corresponding to a layer in the application icon may be acquired according to the level of the layer. The layer in the application icon may be controlled, according to the expanding parameter corresponding to the layer, to expand outward starting from the center location of the application icon. That is, according to the click on the center location of the application icon, the first layer and the third layer may be enlarged at a rate of expansion, and the second layer may be enlarged at a rate of expansion less than that of the first layer and the third layer.

In the embodiment, the click operation on a location of the application icon is received. A layer in the application icon is controlled, according to the click on the location of the application icon, to expand based on an expanding parameter indicated by a level of the layer, showing an effect of animating the application icon, making display of the application icon more fun.

In exemplary embodiments, when a user operates an application icon, according to the operation on the application icon, a layer of a second application icon other than the application icon may be controlled to move according to a designated trajectory.

In exemplary embodiments, according to one or more of a deleting operation, a put-at-top operation, an updating operation, or a fixing operation performed on an application icon by a user, a layer of a second application icon on a display interface of a terminal may be controlled to move according to a designated trajectory. The following is an example where a user performs a deleting operation on an application icon.

Figure 5:
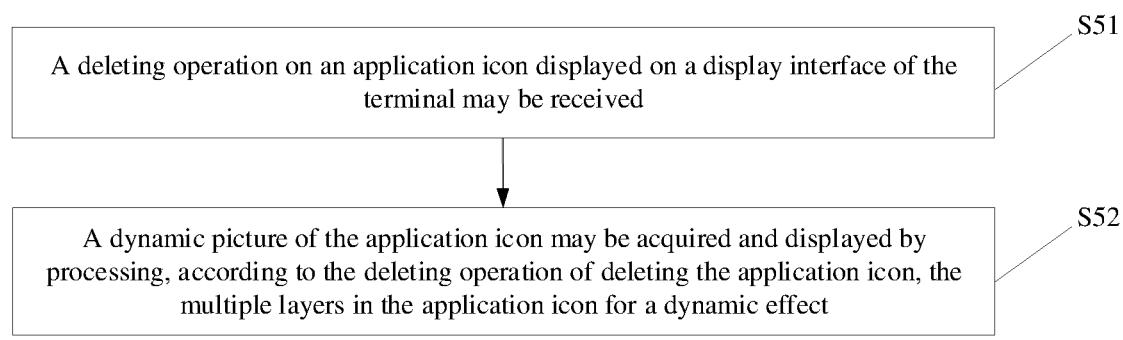
FIG. 5 is a flow diagram of a method for displaying an application icon according to an exemplary embodiment.

FIG. 5 is a flow diagram of a method for displaying an application icon according to an exemplary embodiment. For example, the method for displaying an application icon may be used in a terminal. As shown in FIG. 5, the method may include the following operations.

In S51, a deleting operation on an application icon displayed on a display interface of the terminal may be received.

In the embodiment, an operation on an application icon displayed on a display interface of the terminal may include an operation of deleting the application icon. An application icon may include multiple layers.

In S52, a dynamic picture of the application icon may be acquired and displayed by processing, according to the deleting operation of deleting the application icon, the multiple layers in the application icon for a dynamic effect.

For ease of description, an application icon to be deleted is referred to herein as a first icon, and any application icon on the display interface of the terminal other than the first application icon is referred to herein as a second application icon.

In an embodiment, according to the deleting operation performed on the application icon by a user, a layer of a second application icon may be controlled to move according to a designated trajectory as follows.

Each layer in the first application icon may be controlled to move corresponding to the operation on the first application icon. Each layer of the second application icon may be controlled to move according to the designated trajectory.

A distance between the second application icon and the application icon may be acquired. A starting time when the second application icon starts to move, and a duration in which the second application icon moves, may be determined based on the distance between the second application icon and the first application icon.

Therefore, in a scene of deleting an application icon, each layer in the first application icon may be controlled to move corresponding to the deleting operation, and each layer of the second application icon may be controlled to move according to a designated trajectory. Moreover, it may be preset that the closer the second application icon is to the first application, the earlier and longer the second application icon may move.

In an embodiment, each layer of the second application icon may be controlled to move according to a designated trajectory as follows.

Moving parameters corresponding to the respective layers in the second application icon may be acquired. The moving parameters may be determined based on respective levels of the respective layers in the second application icon. The respective layers in the second application icon may be controlled to move respectively according to the moving parameters, the starting times, and the durations.

For example, to delete the first application icon, each layer in the first application icon may move corresponding to a deleting operation. That is, each layer in the first application icon may explode. Each layer of the second application icon may move along a designated trajectory. For example, the layer of the second application icon may be ejected outward after the simulated explosion. The second application icon may be displayed according to the trajectory of ejecting each layer in the second application icon outward.

In an embodiment, the distance between the second application icon and the first application icon may be acquired. The relationship between locations of the second application icon and the first application icon may be determined. The starting time when the second application icon starts to move, and a duration in which the second application icon moves, may be determined according to the distance between the second application icon and the first application icon as well as the relationship between the locations of the second application icon and the first application icon. The direction in which the second application icon ejects outward may be determined. A level of a layer of the second application icon may be acquired. The level of the layer may indicate an amplitude that the layer is to move. A moving parameter, for ejecting the layer of the second application icon outward at the moment the application icon explodes, may be acquired according to the level of the layer of the second application icon. Accordingly, a layer in the second application icon may be controlled to move according to a designated trajectory, starting at a designated starting time, and in a designated duration.

In the embodiment, the deleting operation on the first application icon is acquired. The layer of the second application icon displayed on the display interface of the terminal may be controlled to move along a designated trajectory. The first application icon is displayed according to the designated trajectory of each layer of each second application icon. When the user performs the operation on the first application icon, a visual effect impacting a second application icon near the first application icon may be simulated according to how the first application icon moves, enriching display of application icons.

Figure 6:
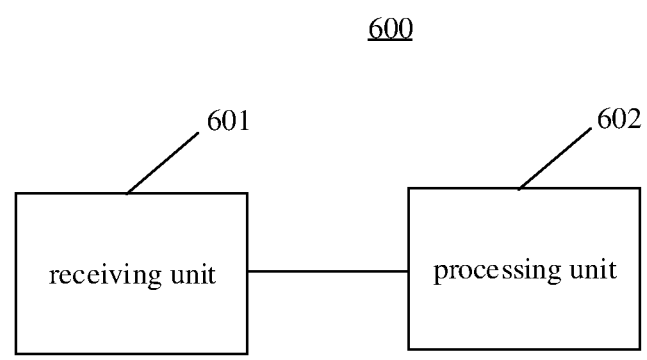
FIG. 6 is a block diagram of a device for displaying an application icon according to an exemplary embodiment.

Embodiments of the present disclosure also provide a device for displaying an application icon. FIG. 6 is a block diagram of a device 600 for displaying an application icon according to an exemplary embodiment. For example, the device 600 may be used in a terminal. Referring to FIG. 6, the device 600 includes a receiving unit 601 and a processing unit 602.

The receiving unit 601 may be adapted to receiving an operation on an application icon displayed on a display interface of the terminal. The processing unit 602 may be adapted to determining and displaying a dynamic picture of the application icon according to the operation.

The application icon may include multiple layers. Each layer of the multiple layers may be a static image or a dynamic image.

The processing unit 602 may be adapted to determining and displaying the dynamic picture of the application icon according to the operation by acquiring and displaying the dynamic picture of the application icon by processing, according to the operation, the multiple layers in the application icon for a dynamic effect.

The processing unit 602 may be adapted to acquiring and displaying the dynamic picture of the application icon by processing, according to the operation, the multiple layers in the application icon for the dynamic effect, by: acquiring an operation parameter of the operation; determining, based on the operation parameter, a processing mode in which the multiple layers in the application icon are processed for the dynamic effect; and acquiring and displaying the dynamic picture of the application icon by processing the multiple layers in the processing mode.

The operation may include at least one of a moving operation, a clicking operation, a deleting operation, a put-at-top operation, an updating operation, or a fixing operation on the application icon.

The operation may include the moving operation of moving the application icon. The processing unit 602 may be adapted to acquiring and displaying the dynamic picture of the application icon by processing, according to the operation, the multiple layers in the application icon for the dynamic effect, by: acquiring a moving speed at which the application icon is to be moved, and a moving direction along which the application icon is to be moved; and acquiring the dynamic picture of the application icon by moving the multiple layers in the application icon according to the moving speed and the moving direction.

The processing unit 602 may be adapted to acquiring the dynamic picture of the application icon by moving the multiple layers in the application icon according to the moving speed and the moving direction, by: acquiring a moving parameter corresponding to a layer in the application icon, the moving parameter being determined based on a level of the layer; moving the layer in the application icon according to the moving parameter, the moving speed, and the moving direction; and displaying the application icon according to a trajectory of the layer in the application icon.

The operation may include the clicking operation on the application icon. The processing unit 602 may be adapted to acquiring and displaying the dynamic picture of the application icon by processing, according to the operation, the multiple layers in the application icon for the dynamic effect, by: acquiring a location where the clicking operation is performed; and acquiring the dynamic picture of the application icon by expanding the multiple layers in the application icon outward starting from the location.

The processing unit 602 may be adapted to acquiring the dynamic picture of the application icon by expanding the multiple layers in the application icon outward starting from the location, by: acquiring an expanding parameter corresponding to a layer in the application icon, the expanding parameter being determined based on a level of the layer; expanding, according to the expanding parameter, the layer in the application icon outward starting from the location; and displaying the application icon according to a trajectory of expansion of the layer in the application icon.

The operation may include the deleting operation of deleting the application icon. The processing unit 602 may be adapted to acquiring and displaying the dynamic picture of the application icon by processing, according to the operation, the multiple layers in the application icon for the dynamic effect, by: acquiring a distance between a second application icon and the application icon, a first application icon, according to the operation on the first application icon; determining, based on the distance, starting times when respective layers in the second application icon start to move, and durations in which the respective layers in the second application icon move; and determining a dynamic picture of the second application icon according to the distance, the starting times, and the durations. The second application icon may be any other application icon displayed on the display interface of the terminal other than the first application icon.

The processing unit 602 may further be adapted to moving a layer in the first application icon corresponding to the operation on the first application icon, and determining the dynamic picture of the first application icon, by: acquiring moving parameters corresponding to the respective layers in the second application icon, the moving parameters being determined based on respective levels of the respective layers in the second application icon; moving the respective layers in the second application icon respectively according to the moving parameters, the starting times, and the durations; and displaying the first application icon according to a trajectory of the layer in the first application icon.

Figure 7:
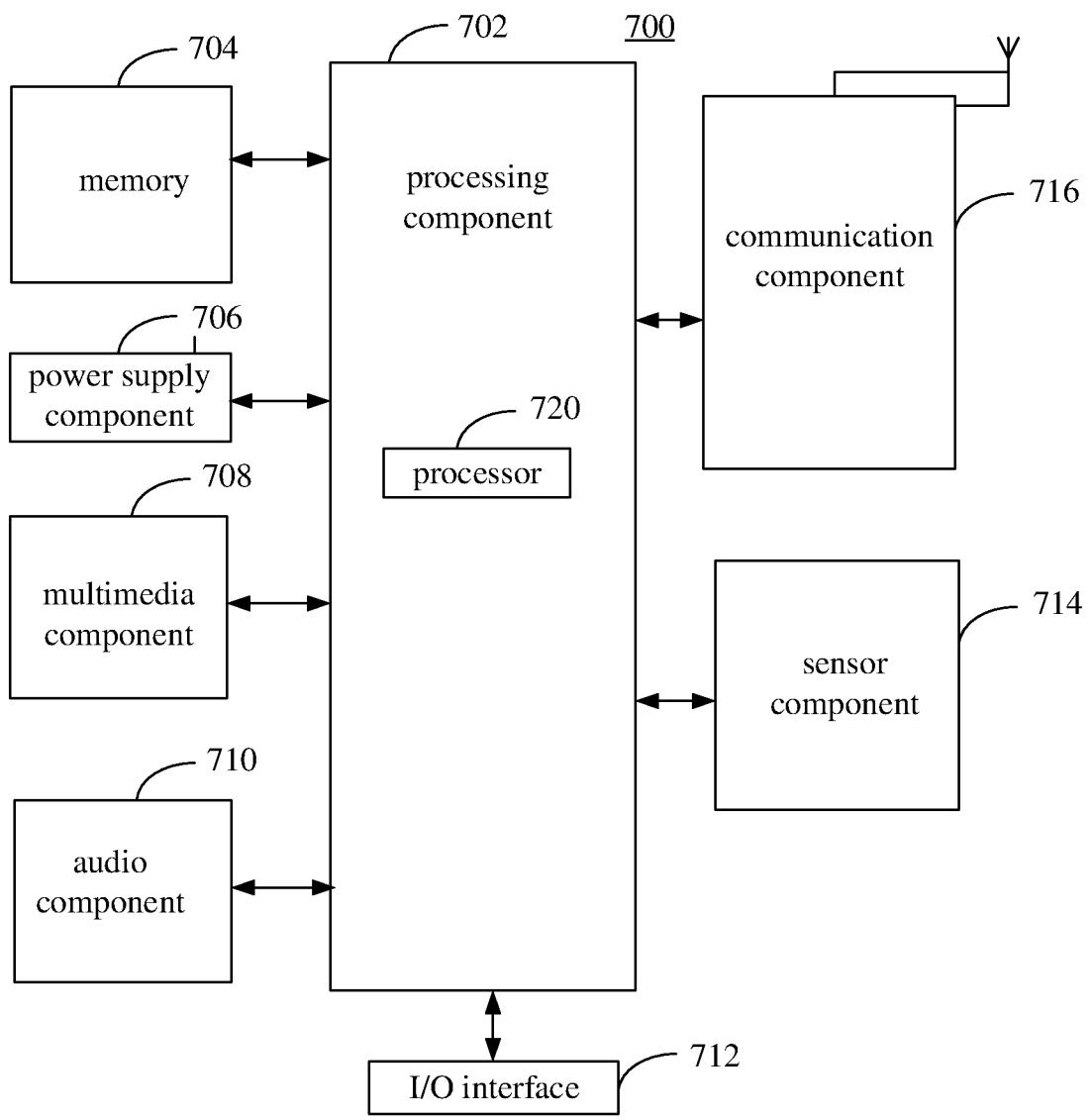
FIG. 7 is a block diagram of a device according to an exemplary embodiment.

FIG. 7 is a block diagram of a device 700 for displaying an application icon according to an exemplary embodiment. For example, the device 700 may be a terminal, such as a mobile phone, a computer, a digital broadcasting terminal, a message transceiver, a game console, a tablet device, a medical device, a fitness device, a Personal Digital Assistant (PDA), etc.

Referring to FIG. 7, the device 700 may include one or more of a processing component 702, memory 704, a power supply component 706, a multimedia component 708, an audio component 710, an Input/Output (I/O) interface 712, a sensor component 714, and a communication component 716.

The processing component 702 generally controls an overall operation of the device 700, such as operations associated with display, a telephone call, data communication, a camera operation, and a recording operation. The processing component 702 may include one or more processors 720 to execute instructions so as to complete all or some options of the method. In addition, the processing component 702 may include one or more modules to facilitate interaction between the processing component 702 and other components. For example, the processing component 702 may include a multimedia module to facilitate interaction between the multimedia component 708 and the processing component 702.

The memory 704 may be configured for storing various types of data to support the operation on the device 700. Example of such data may include instructions of any application or method configured for operating on the device 700, contact data, phonebook data, messages, pictures, videos, and/or the like. The memory 704 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 706 may supply electric power to various components of the device 700. The power supply component 706 may include a power management system, one or more power sources, and other components related to generating, managing and distributing electricity for the device 700.

The multimedia component 708 may include a screen providing an output interface between the device 700 and a user. The screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. The multimedia component 708 may include a front camera and/or a rear camera. When the device 700 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 710 may be configured for outputting and/or inputting an audio signal. For example, the audio component 710 may include a microphone (MIC). When the device 700 is in an operation mode such as a call mode, a recording mode, and a voice recognition mode, the MIC may be configured for receiving an external audio signal. The received audio signal may be further stored in the memory 704 or may be sent via the communication component 716. The audio component 710 may further include a loudspeaker configured for outputting the audio signal.

The I/O interface 712 may provide an interface between the processing component 702 and a peripheral interface module. Such a peripheral interface module may be a keypad, a click wheel, a button or the like. Such a button may include but is not limited to: a homepage button, a volume button, a start button, and a lock button.

The sensor component 714 may include one or more sensors for assessing various states of the device 700. For example, the sensor component 714 may detect an on/off state of the device 700 and relative positioning of components such as the display and the keypad of the device 700. The sensor component 714 may further detect a change in the position of the device 700 or of a component of the device 700, whether there is contact between the device 700 and a user, the orientation or acceleration/deceleration of the device 700, and a change in the temperature of the device 700. The sensor component 714 may include a proximity sensor configured for detecting existence of a nearby object without physical contact. The sensor component 714 may further include an optical sensor such as a Complementary Metal-Oxide-Semiconductor (CMOS) or Charge-Coupled- Device (CCD) image sensor used in an imaging application. The sensor component 714 may further include an acceleration sensor, a gyroscope sensor, a magnetic sensor, a pressure sensor, a microwave sensor, or a temperature sensor.

The communication component 716 may be configured for facilitating wired or wireless communication between the device 700 and other equipment. The device 700 may access a wireless network based on a communication standard such as WiFi, 4G or 5G, or combination thereof. The communication component 716 may receive a broadcast signal or broadcast related information from an external broadcast management system via a broadcast channel. The communication component 716 may further include a Near Field Communication (NFC) module for short-range communication. For example, the communication component 716 may be based on Radio Frequency Identification (RFID), Infrared Data Association (IrDA), Ultra-Wideband (UWB) technology, Bluetooth (BT), and other technologies.

The device 700 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components to implement the method.

In exemplary embodiments, there is also provide a non-transitory computer-readable storage medium including instructions, such as the memory 704 including instructions. The instructions may be executed by the processor 720 of the device 700 to implement the method described above. For example, the non-transitory computer-readable storage medium may be a Read-Only Memory (ROM), a Compact Disc Read-Only Memory (CD-ROM), a magnetic tape, a floppy disk, optical data storage equipment, etc.

Other implementations of the present disclosure will be apparent to a person having ordinary skill in the art that has considered the specification or practiced the disclosure. The disclosure is intended to cover any variation, use, or adaptation of the disclosure following the general principles of the disclosure and including such departures from the disclosure as come within common knowledge or customary practice in the art. The specification and the embodiments are intended to be exemplary only, with a true scope and spirit of the subject disclosure being indicated by the appended claims.

The disclosure is not limited to the exact construction that has been described above and illustrated in the accompanying drawings, and that various modifications and changes may be made to the subject disclosure without departing from the scope of the disclosure. It is intended that the scope of the disclosure is limited only by the appended claims.

What is claimed is:

1. A method for displaying an application icon on a terminal, the method comprising:
    receiving an operation performed on an application icon displayed on a display interface of the terminal, wherein the application icon comprises multiple layers; and
    acquiring and displaying a dynamic picture of the application icon by processing, according to the operation, the multiple layers in the application icon for a dynamic effect,
    wherein a level of a layer of the multiple layers indicates an amplitude of movement of the layer,
    wherein acquiring and displaying the dynamic picture of the application icon by processing, according to the operation, the multiple layers in the application icon for the dynamic effect comprises:
        acquiring a distance between a second application icon and the application icon according to the operation on the application icon, the second application icon being an application icon displayed on the display interface of the terminal other than the application icon;
        determining, based on the distance, starting times when respective layers in the second application icon start to move, and durations in which the respective layers in the second application icon move; and
        determining a dynamic picture of the second application icon according to the distance, the starting times, and the durations.

2. The method of claim 1, wherein each layer of the multiple layers is one of a static image or a dynamic image.

3. The method of claim 1, wherein acquiring and displaying the dynamic picture of the application icon by processing, according to the operation, the multiple layers in the application icon for the dynamic effect comprises:
    acquiring an operation parameter of the operation;
    determining, based on the operation parameter, a processing mode in which the multiple layers in the application icon are processed for the dynamic effect; and
    acquiring and displaying the dynamic picture of the application icon by processing the multiple layers in the processing mode.

4. The method of claim 1, wherein the operation comprises at least one of a moving operation, a clicking operation, a deleting operation, a put-at-top operation, an updating operation, or a fixing operation on the application icon.

5. The method of claim 4, wherein the operation comprises the moving operation of moving the application icon, wherein acquiring the dynamic picture of the application icon by processing, according to the operation, the multiple layers in the application icon for the dynamic effect comprises:
    acquiring a moving speed at which the application icon is moved, and a moving direction along which the application icon is moved; and
    acquiring the dynamic picture of the application icon by moving the multiple layers in the application icon according to the moving speed and the moving direction.

6. The method of claim 5, wherein acquiring the dynamic picture of the application icon by moving the multiple layers in the application icon according to the moving speed and the moving direction comprises:
    acquiring a moving parameter corresponding to the layer in the application icon, the moving parameter being determined based on the level of the layer;
    moving the layer in the application icon according to the moving parameter, the moving speed, and the moving direction; and
    displaying the application icon according to a trajectory of the layer in the application icon.

7. The method of claim 4, wherein the operation comprises the clicking operation on the application icon, wherein acquiring the dynamic picture of the application icon by processing, according to the operation, the multiple layers in the application icon for the dynamic effect comprises:
    acquiring a location where the clicking operation is performed; and
    acquiring the dynamic picture of the application icon by expanding the multiple layers in the application icon outward starting from the location.

8. The method of claim 7, wherein acquiring the dynamic picture of the application icon by expanding the multiple layers in the application icon outward starting from the location comprises:
acquiring an expanding parameter corresponding to the layer in the application icon, the expanding parameter being determined based on the level of the layer;
expanding, according to the expanding parameter, the layer in the application icon outward starting from the location; and
displaying the application icon according to a trajectory of expansion of the layer in the application icon.

9. The method of claim 4, wherein the operation comprises the deleting operation of deleting the application icon.

10. The method of claim 9, further comprising:
moving the layer in the application icon corresponding to the operation on the application icon,
wherein determining the dynamic picture of the application icon comprises:
acquiring moving parameters corresponding to the respective layers in the second application icon, the moving parameters being determined based on respective levels of the respective layers in the second application icon;
moving the respective layers in the second application icon respectively according to the moving parameters, the starting times, and the durations; and
displaying the application icon according to a trajectory of the layer in the application icon.

11. A terminal, comprising:
a processor; and
a memory storing an instruction executable by the processor,
wherein the processor is configured to:
receive an operation performed on an application icon displayed on a display interface of the terminal, wherein the application icon comprises multiple layers; and
acquire and display a dynamic picture of the application icon by processing, according to the operation, the multiple layers in the application icon for a dynamic effect,
wherein a level of a layer of the multiple layers indicates an amplitude of movement of the layer,
wherein the processor is configured to acquire and display the dynamic picture of the application icon by processing, according to the operation, the multiple layers in the application icon for the dynamic effect, by:
acquiring a distance between a second application icon and the application icon according to the operation on the application icon, the second application icon being an application icon displayed on the display interface of the terminal other than the application icon;
determining, based on the distance, starting times when respective layers in the second application icon start to move, and durations in which the respective layers in the second application icon move; and
determining a dynamic picture of the second application icon according to the distance, the starting times, and the durations.

12. The terminal of claim 11, wherein each layer of the multiple layers is one of a static image or a dynamic image.

13. The terminal of claim 11, wherein the operation comprises at least one of a moving operation, a clicking operation, a deleting operation, a put-at-top operation, an updating operation, or a fixing operation on the application icon.

14. The terminal of claim 13, wherein the operation comprises the moving operation of moving the application icon, wherein the processor is further configured to:
acquire a moving speed at which the application icon is moved, and a moving direction along which the application icon is moved; and
acquire the dynamic picture of the application icon by moving the multiple layers in the application icon according to the moving speed and the moving direction.

15. The terminal of claim 13, wherein the operation comprises the clicking operation on the application icon, wherein the processor is further configured to:
acquire a location where the clicking operation is performed; and
acquire the dynamic picture of the application icon by expanding the multiple layers in the application icon outward starting from the location.

16. The terminal of claim 13, wherein the operation comprises the deleting operation of deleting the application icon.

17. The terminal of claim 16, wherein the processor is further configured to:
move the layer in the application icon corresponding to the operation on the application icon; and
determine the dynamic picture of the application icon, by:
acquiring moving parameters corresponding to the respective layers in the second application icon, the moving parameters being determined based on respective levels of the respective layers in the second application icon;
moving the respective layers in the second application icon respectively according to the moving parameters, the starting times, and the durations; and
displaying the application icon according to a trajectory of the layer in the application icon.

18. A non-transitory computer-readable storage medium, having stored thereon computer executable instructions which, when executed by a processor, implement:
receiving an operation performed on an application icon displayed on a display interface of a terminal, wherein the application icon comprises multiple layers; and
acquiring and displaying a dynamic picture of the application icon by processing, according to the operation, the multiple layers in the application icon for a dynamic effect,
wherein a level of a layer of the multiple layers indicates an amplitude of movement of the layer,
wherein acquiring and displaying the dynamic picture of the application icon by processing, according to the operation, the multiple layers in the application icon for the dynamic effect comprises:
acquiring a distance between a second application icon and the application icon according to the operation on the application icon, the second application icon being an application icon displayed on the display interface of the terminal other than the application icon;
determining, based on the distance, starting times when respective layers in the second application icon start to move, and durations in which the respective layers in the second application icon move; and
determining a dynamic picture of the second application icon according to the distance, the starting times, and the durations.

* * * * *